(12) United States Patent
Shaha et al.

(10) Patent No.: US 8,757,397 B2
(45) Date of Patent: Jun. 24, 2014

(54) BICYCLE STORAGE SYSTEM

(75) Inventors: Kevin Bruce Shaha, Dover, ID (US); Marcus Bosch, Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 417 days.

(21) Appl. No.: 12/727,056

(22) Filed: Mar. 18, 2010

(65) Prior Publication Data

US 2010/0237026 A1 Sep. 23, 2010

Related U.S. Application Data

(60) Provisional application No. 61/162,163, filed on Mar. 20, 2009.

(51) Int. Cl.
*A47F 7/00* (2006.01)
*B66D 1/26* (2006.01)

(52) U.S. Cl.
USPC .......................................... 211/17; 254/278

(58) Field of Classification Search
CPC .............. B06D 3/02; B06D 3/04; B06D 3/06; B06D 3/08; B06D 3/10; B62H 3/00; B62H 3/12; B66F 7/02; B66C 1/10
USPC ................ 211/17, 18, 19, 20, 113, 115, 116, 211/119.11, 119.1, 119.12; 248/332, 317, 248/320, 321, 329, 328, 343; 254/278, 334, 254/338; 294/67.41, 67.4, 67.3, 67.33, 294/67.22, 67.1
See application file for complete search history.

(56) References Cited

U.S. PATENT DOCUMENTS

| 534,869 | A | * | 2/1895 | Emery | 248/55 |
| 624,231 | A | * | 5/1899 | Martin | 211/17 |
| 897,690 | A | * | 9/1908 | Waters | 248/331 |
| 983,957 | A | * | 2/1911 | Trantham | 254/338 |
| 2,798,680 | A | * | 7/1957 | Farrington et al. | 242/373 |
| 3,872,972 | A | * | 3/1975 | Cummins et al. | 211/17 |
| 3,924,751 | A | * | 12/1975 | Ballenger | 211/17 |
| 4,057,211 | A | * | 11/1977 | Moore | 248/332 |
| 4,872,632 | A | * | 10/1989 | Johnson | 248/332 |
| 5,354,035 | A | | 10/1994 | Helgren | |

(Continued)

FOREIGN PATENT DOCUMENTS

| CN | 2782513 | 4/2005 |
| DE | 478431 | 6/1929 |
| DE | 8907725 | 10/1989 |

*Primary Examiner* — Joshua Rodden
*Assistant Examiner* — Patrick Hawn
(74) *Attorney, Agent, or Firm* — Mark W. Croll; Maurice E. Finnegan, III; Beem Patent Law Firm

(57) ABSTRACT

A storage system for elevating objects from a surface, such as storing a bicycle off the ground, the storage system including a first mounting plate coupled to a wheel; a second mounting plate spaced from the first mounting plate and coupled to a plurality of wheels; a first wheel assembly spaced from the first mounting plate; a second wheel assembly spaced from the second mounting plate; a cable operatively engaging each of the wheels; and a coupler extending from the first wheel assembly and a second coupler extending from the second wheel assembly. Each of the mounting plates may be made from a unitary piece of material, and each plate may include a plurality of arched channels for rotatably adjusting the mounting plates, e.g., to provide for generally linear alignment of pulley wheels when installing the system.

12 Claims, 4 Drawing Sheets

(56) References Cited

U.S. PATENT DOCUMENTS

| | | | |
|---|---|---|---|
| 5,460,274 A * | 10/1995 | Kramer | 211/17 |
| 5,897,104 A * | 4/1999 | Garbiso | 254/334 |
| 6,056,274 A * | 5/2000 | Naas et al. | 254/335 |
| 6,161,702 A * | 12/2000 | Campbell | 211/17 |
| 6,234,454 B1 * | 5/2001 | Vassioukevitch | 254/391 |
| 6,568,511 B1 * | 5/2003 | Day | 188/65.4 |
| 6,685,171 B2 * | 2/2004 | Lob et al. | 254/391 |
| 6,959,918 B1 * | 11/2005 | Samuels | 254/338 |
| 7,073,780 B2 * | 7/2006 | Stone | 254/391 |
| 7,150,449 B1 | 12/2006 | Dueck et al. | |
| 7,226,043 B2 * | 6/2007 | Stone et al. | 254/391 |
| 7,234,686 B2 * | 6/2007 | Stone et al. | 254/391 |
| 7,367,547 B2 | 5/2008 | Pizak | |
| 7,367,548 B2 | 5/2008 | Rosenfeldt et al. | |
| D570,765 S | 6/2008 | Trusty et al. | |
| D571,279 S | 6/2008 | Trusty et al. | |
| 7,494,110 B2 * | 2/2009 | Lob et al. | 254/334 |
| 7,631,854 B1 | 12/2009 | Mountain | |
| 7,681,853 B2 | 3/2010 | Trusty et al. | |
| 7,841,448 B2 | 11/2010 | Lair | |
| 8,033,529 B2 * | 10/2011 | Boda et al. | 254/372 |
| 8,056,883 B1 * | 11/2011 | Brockie | 254/278 |
| 2006/0080904 A1 * | 4/2006 | Shaha | 52/79.1 |
| 2008/0060874 A1 | 3/2008 | Lair | |
| 2009/0283484 A1 | 11/2009 | Trusty et al. | |
| 2011/0073729 A1 | 3/2011 | DeSautel | |

\* cited by examiner

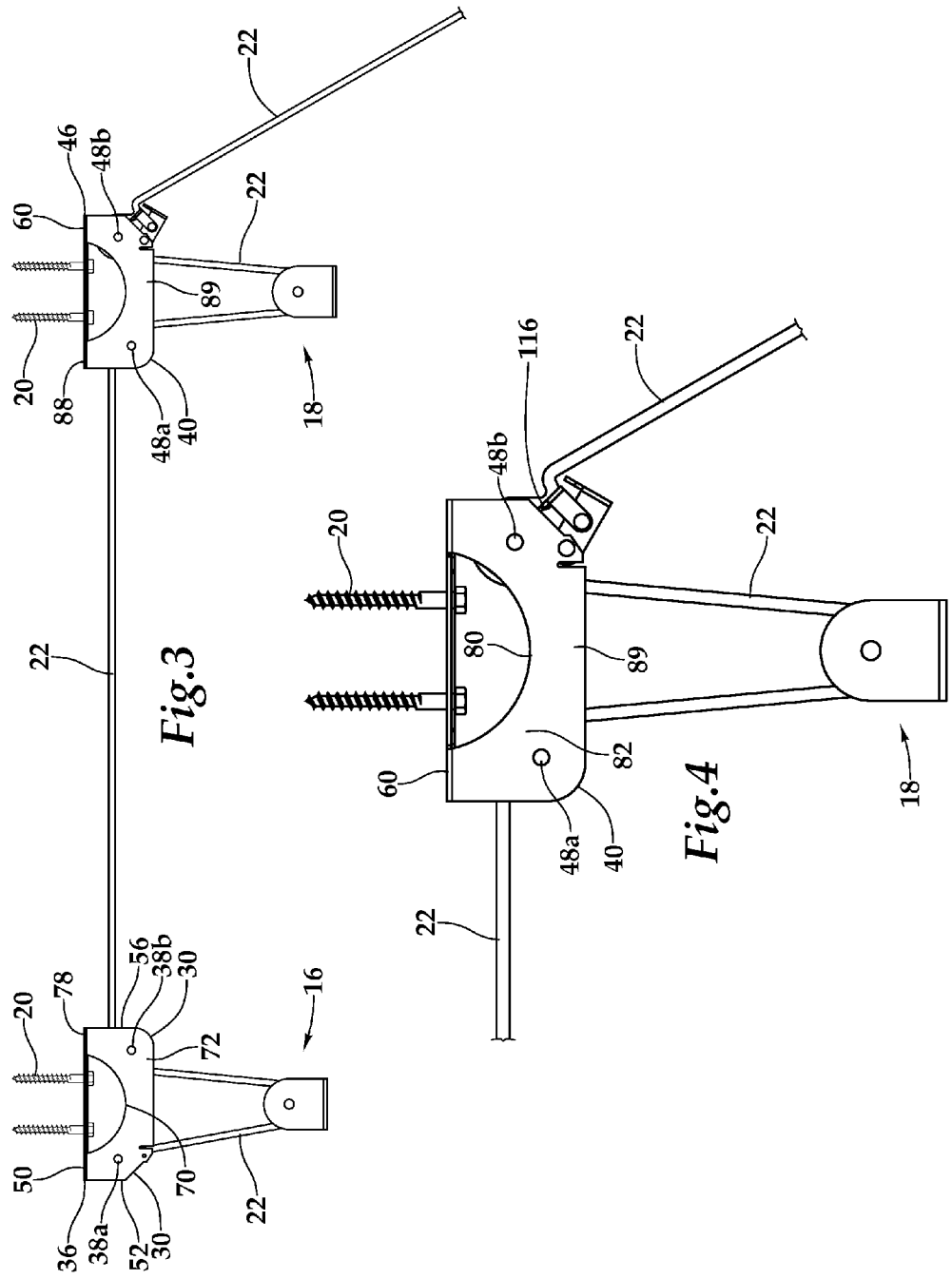

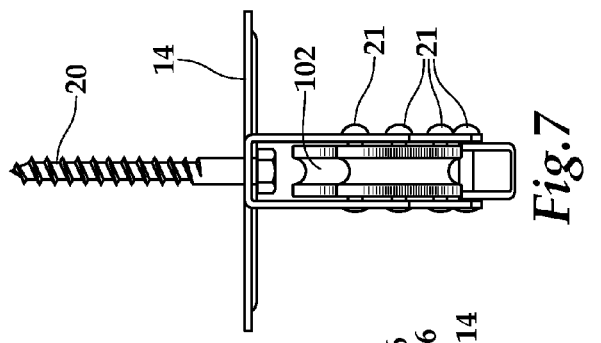
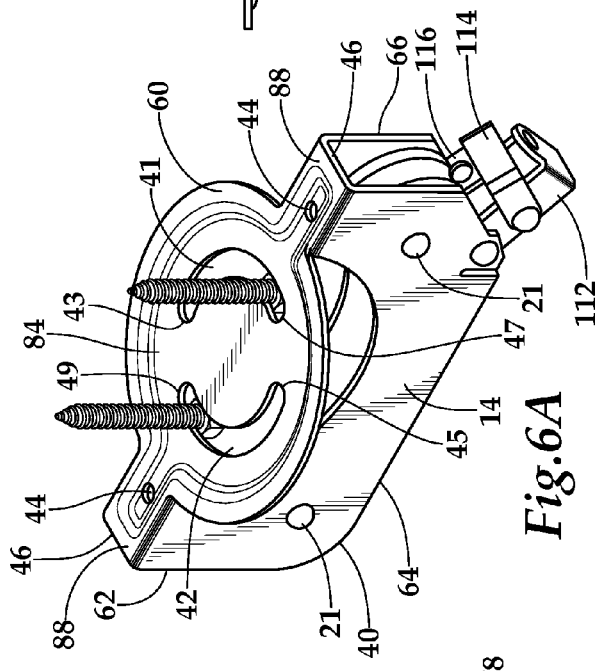
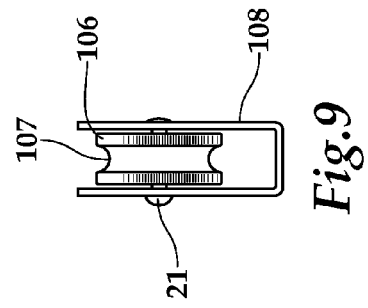
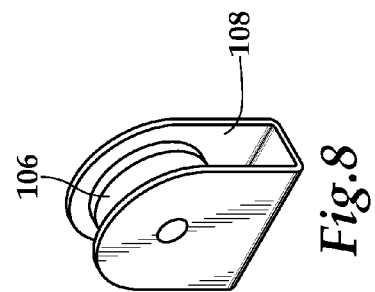
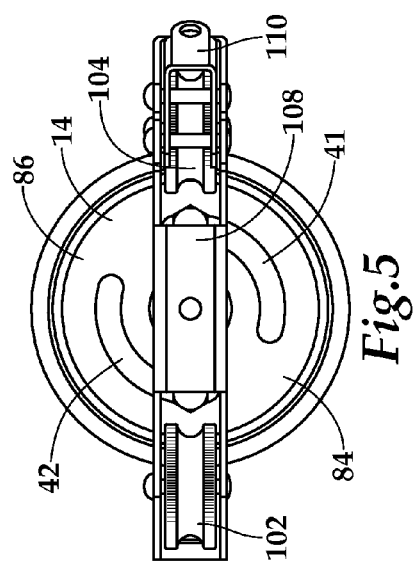
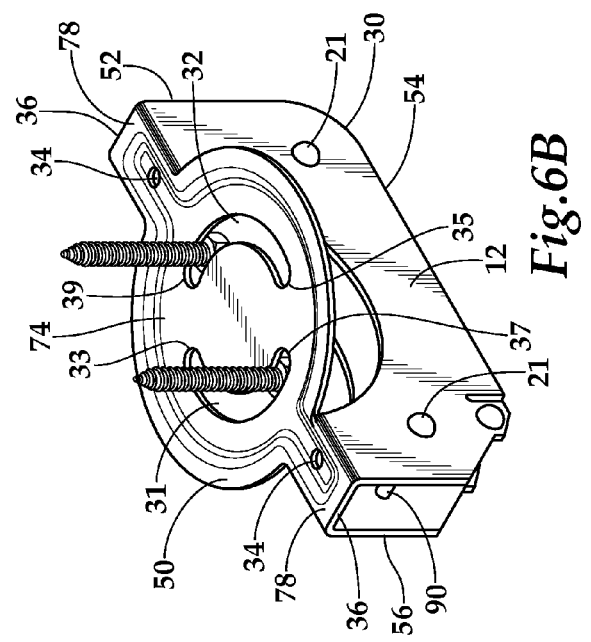

BICYCLE STORAGE SYSTEM

BACKGROUND OF THE INVENTION

1. Field of the Invention

The present invention is directed to a system for storing objects such as bicycles.

2. Description of the Related Art

Bicycle racks come in various configurations, depending on how the bicycle is to be stored. For example, some racks are floor stands that accommodate the front or rear wheel to hold the bicycle in place. These racks may require substantial floor space to accommodate the bicycle, and bicycles still may be susceptible to falling over if the wheels are not held adequately.

Other racks may allow for bicycles to be stored parallel to a wall and stacked vertically with respect to one another. While occupying less floor space protruding into the room, these racks still reduce the amount of floor space available to the user.

Still other storage solutions involve hanging bikes on hooks installed either in a wall or a ceiling support. However, these racks require the user expend energy to lift the bikes, and it may be awkward to the user to have to position the bike on the hook, which may result in the user becoming fatigued and/or dirty, e.g., if the user accidentally grabs the greased chain to support the bike.

What is needed is a storage solution that avoids the drawbacks of these traditional racks, hooks or other systems.

BRIEF SUMMARY OF THE INVENTION

In one aspect, a storage system may comprise a first mounting plate coupled to a wheel; a second mounting plate spaced from the first mounting plate and coupled to a plurality of wheels; a first wheel assembly spaced from the first mounting plate; a second wheel assembly spaced from the second mounting plate; a cable operatively engaging each of the wheels; and a coupler extending from the first wheel assembly and a second coupler extending from the second wheel assembly; wherein the first and second mounting plates each have a plurality of arched channels for rotatably adjusting the mounting plates. Each of the mounting plates may be formed from a unitary structure such as stamped sheet metal and may comprise a base substantially parallel to a mounting surface and a plurality of sides extending downward from the base. The second mounting plate also may comprise a self-locking mechanism, and the couplers may each comprise a strap operatively coupled to a carabineer.

In another aspect, a storage system may comprise a plurality of plates, each plate having a top with a base portion and a plurality of extensions extending away from the base portion; the base portions comprising a plurality of fastener-receiving arched channels; the plates further comprising a plurality of downwardly extending portions that may be generally parallel, where each downwardly extending portion has top edges that are adjacent to and may be integral with at least two of the extensions; at least one pulley for each of the plates that is rotatably coupled to the downwardly extending portions; a plurality of pulleys extending downward from the plates; and a cable operatively engaging the pulleys that are coupled to the plates and the pulleys extending downward from the plates. In one embodiment, the system may comprise two plates, where a second plate has a second pulley rotatably coupled to the downwardly extending portions. In addition, the system may include a self-locking mechanism coupled to the second plate, the self-locking mechanism including a first bracket coupled to the downwardly extending portions and a second bracket coupled to the first bracket. In addition, each of the downwardly extending pulleys may be coupled to a pulley frame, and each pulley frame may engage a coupling mechanism.

In still another aspect, a method of making a plate subsystem for a storage system from a unitary plate having a length and a width may include the steps of: removing material from a central portion of the plate to form a pair of generally diametrically opposed slots; making a pair of generally diametrically opposed notches spaced radially outwardly from the slots, the notches having a length less than a length of said plate such that plate material exists between the notch ends and the top and bottom plate edges; making a pair of holes completely through the plate, the holes being substantially equally spaced from an edge of the plate and substantially symmetrically spaced from a centerline of the plate that runs along the plate length; and bending portions of the plate spaced radially outward from the notches away from the central portion. The method also may include coupling a pulley to the plate by inserting a fastener through the holes and pulley. In addition, each notch may have substantially the same radius of curvature and may be less than half of a circumference, and the notches may be oriented such that the ends of each notch may be substantially aligned along a line parallel to the centerline.

The method also may include the steps of making a second pair of holes completely through the plate, the second holes being substantially equally spaced from the edge of said plate and proximate opposing sides of the plate and coupling a self-locking mechanism to the plate by inserting a fastener through the second holes and the self-locking mechanism. Moreover, the method may include the steps of making a third pair of holes completely through the plate, the second holes being substantially equally spaced from an opposite edge of the plate and substantially symmetrically spaced from the centerline, and coupling a second pulley to the plate by inserting a fastener through the third holes and the second pulley.

BRIEF DESCRIPTION OF THE SEVERAL VIEWS OF THE DRAWINGS

FIG. 3 is another side view of the pulley system of FIG. 1.

FIG. 4 is a side, detail view of a second mounting plate and wheel assembly.

FIG. 5 is a bottom view of the second mounting plate and wheel assembly of FIG. 4.

FIG. 6A is a top, perspective view of the second mounting plate of FIG. 3, with fasteners.

FIG. 6B is a top, perspective view of the first mounting plate of FIG. 3, with fasteners.

FIG. 7 is a rear view of the second mounting plate of FIG. 4.

FIG. 8 is a top, perspective view of one of the wheel assemblies of FIG. 1.

FIG. 9 is a front view of the wheel assembly of FIG. 8.

DETAILED DESCRIPTION

Figure 1:
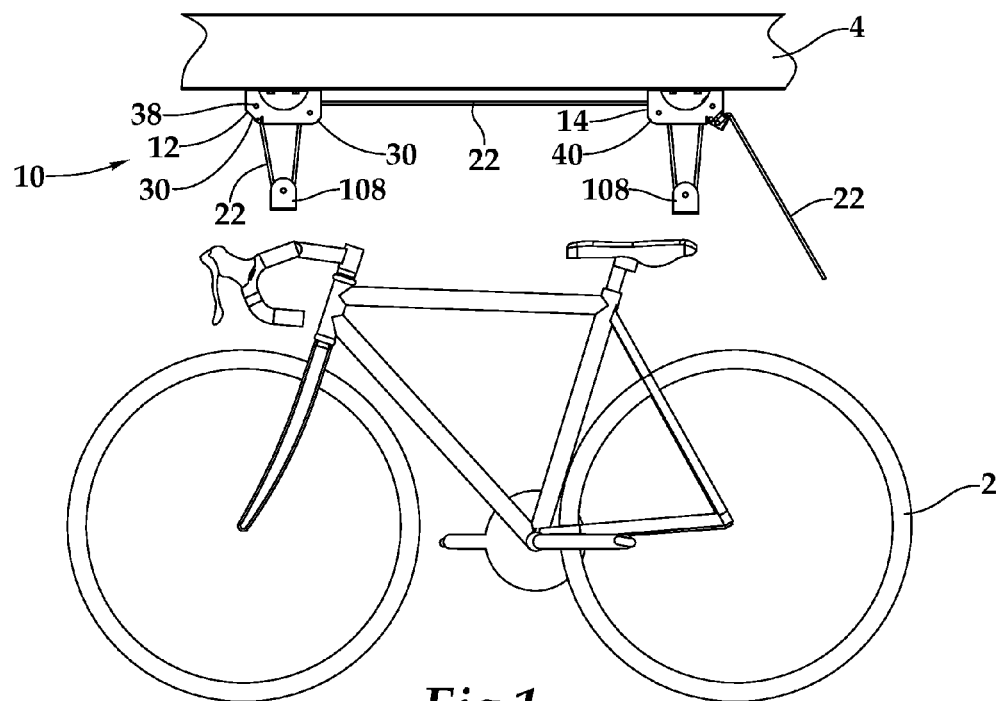
FIG. 1 is a side view of a pulley system of one embodiment of the present invention, shown without attachments for engaging a bicycle.
Figure 2:
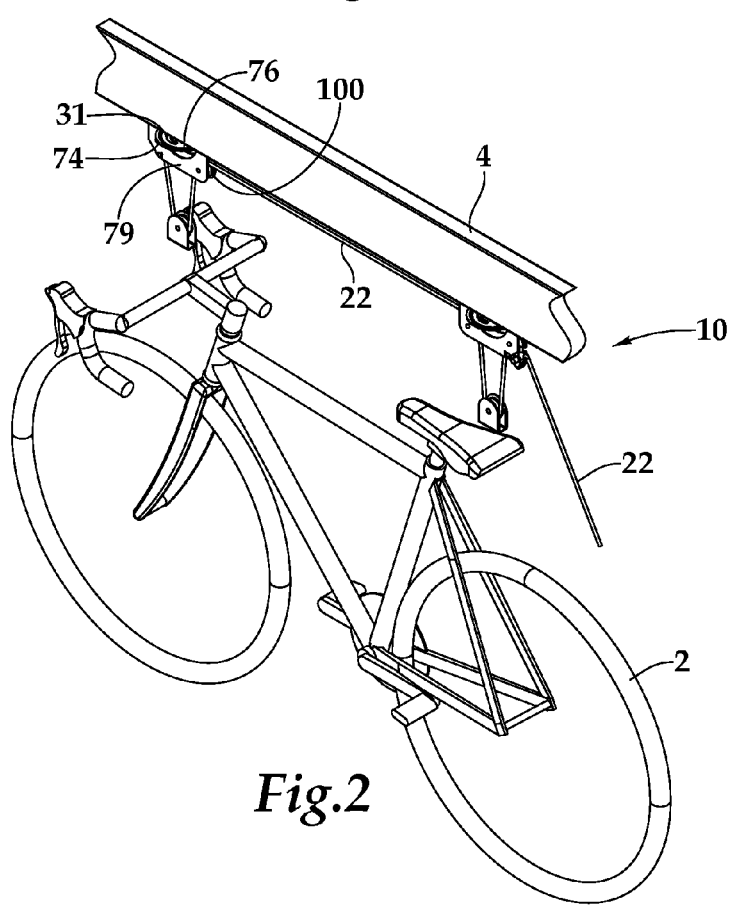
FIG. 2 is a side, perspective view of the pulley system of FIG. 1.

In one embodiment, a system 10 for storing objects, such as a bicycle, in an elevated location, as seen in FIGS. 1-3. The apparatus may comprise a pulley-operated hoist system 10 by which the bicycle may be elevated off the floor to an overhead location, freeing up floor space. The system 10 may include a plurality of mounting plates 12, 14, each plate supporting a pulley subsystem 16, 18. In addition, the system 10 may include a plurality of fasteners 20 for mounting the system 10 to one or more supports, a rope or cable 22 for operatively engaging the pulley subsystems, a self-locking mechanism 110 on at least one of the mounting plates, and implements 122 for engaging and supporting the object to be elevated.

The apparatus 10 may have a plurality of mounting plates, preferably two plates 12, 14. Each mounting plate may be substantially similarly shaped, which may simplify manufacture and assembly. For example, a first mounting plate 12 may be formed from a single piece of material such as sheet metal. The first mounting plate 12 may originally be a generally rectangular piece of material from which the corners 30 (and similar corners 40 on second plate 14) may be rounded or otherwise truncated, which may reduce the total weight of the system and, therefore, the weight required to be borne by the fasteners 20 supporting the system 10 and also may eliminate sharper corners that may promote fraying or cutting of the cable 22 running along pulley. FIGS. 4-6B, particularly FIG. 6A, show these elements in a second mounting plate (described below), but these elements are similar in both the first and second plates 12, 14.

To form mounting plate 12, 14 a plurality of generally diametrically opposed arched slots 31, 41 may be stamped from or otherwise removed from the mounting plate 12, 14 as may a plurality of openings 34, 44 substantially centered on a width of the mounting plate 12, 14 proximate the outer edges 36, 46, as seen in FIGS. 5, 6A, and 6B. Arched slots 31, 41 and/or openings 34, 44 may have a width sized for accepting shanks but not heads of a variety of different fasteners 20, including, e.g., #10×2" sheet metal screws. Slots 31, 41 may allow mounting plates 12, 14 to be rotationally oriented between about 90 degrees and about 180 degrees in order to align mounting plates 12, 14 with one another in the event that the supports to which plates are mounted are not substantially aligned. In addition, one slot 31, 41 may have substantially the same inner and outer diameters as a second slot 32, 42, a leading end 33, 43 of one slot may be generally diametrically opposed from the leading end 35, 45 of the second slot 32, 42, and the trailing end 37, 47 of one slot 31, 41 also may be generally diametrically opposed from the trailing end 39, 49 of the second slot 32, 42. Moreover, a plurality of openings 38, 48 through which pulley-supporting fasteners 21 are fed may be formed in the mounting plate 12, 14. A plurality of first openings 38a may be generally symmetric about both a width and a length of the mounting plate 12, 14 and may be approximately equidistantly spaced from a top 50, 60 and a respective side 52, 62 of the plate 12, 14 by a distance approximately equal to the radius of the pulley mounted via those openings. A plurality of second openings 38b also may be generally symmetrical about both a width and length of the mounting plate 12, 14 but may be spaced closer to a bottom 54, 64 of the plate than to a respective side 56, 66.

Returning to FIGS. 3-4, to continue forming mounting plate 12, 14, a plurality of arched notches 70, 80 may be formed in mounting plate 12, 14, spaced outward from the arched slots 31, 32 a radial distance approximately equal to a width of the arched slots 31, 32. Arched notches 70, 80 may extend between about 90 degrees and about 179 degrees, preferably between about 120 degrees and about 170 degrees, still more preferably between about 150 degrees and about 170 degrees. Mounting plate 12, 14 then may be formed by bending portions 72, 82 of the plate that extend outward from arched notches 70, 80 downward and substantially normal to portions 74, 84 of the plate spaced inward from arched notches 70, 80. In this configuration, mounting plate 12, 14 may have a generally circular base 76, 86 with a plurality of generally coplanar, generally rectangular portions 78, 88 extending outward and a plurality of generally rectangular or C-shaped sides 79, 89 extending downward from, and connecting, the coplanar portions 78, 88. Original generally rectangular piece from which mounting plate is formed may have a length and a width between about 4" and about 8", preferably between about 5" and about 7", still more preferably about 6". In one embodiment, the plate 12, 14 may be about 6" in a direction parallel to the eventual bends and about 6.16" in a generally perpendicular direction. In addition, as formed, generally circular base 76, 86 may have a diameter between about 2" and about 5", preferably between about 3" and about 4", and in one embodiment about 3.84".

System may include a plurality of mounting plates, each made in a similar fashion. A first mounting plate 12 may include a post 90 mounted via a fastener 21 in the plurality of second openings 38 that may provide an anchor for one end of the rope or cable 22 used in the pulley system 10. When mounting plate 12 is bent, symmetry of openings means that first and second openings 38a, 38b for supporting pulley wheels 106 may be substantially aligned. Alternatively, first mounting plate 12 may include an opening through which rope 22 may be passed, the end of the rope 22 then being knotted, thus preventing the end from passing back through the opening. In addition, system 10 may include a pulley 100 mounted via a fastener 38 passed through plurality of first openings 34.

A second mounting plate 14 similar to first mounting plate 12 may operatively engage a first pulley 102 mounted via a fastener 21 in the plurality of first openings 48a and a second pulley 104 mounted via another fastener 21 in the plurality of second openings 48b. Second mounting plate 14 further may include a self-locking mechanism 110 comprising a first bracket 112 rotationally engaged with the second mounting plate 14 and a second bracket 114 rotationally engaged with the first bracket 112. As seen in FIGS. 6-7, first bracket 112 may be mounted at its open end to mounting plate 14 below second pulley 104. In addition, first bracket 112 may be generally U-shaped or L-shaped and may pivot proximate its open end. Second bracket 114 may also be generally U-shaped or L-shaped and may be mounted at its open end to first bracket 112. Additionally, second bracket 114 may include a protrusion 116 at a distal end for engaging rope 22 to increase frictional engagement between rope 22 and locking mechanism 110.

Turning to FIGS. 8-9, storage system 10 may include additional pulley components to assist in hoisting of the bicycle, including a plurality of wheels 106 spaced vertically downward from the first and second mounting plates. Each wheel 106 also may be rotationally coupled to a separate frame member 108 to which bicycle supports 120 may be affixed. Like the other wheels used within the system, these wheels 106 may have a central groove 107 around their circumference for accepting rope 22.

Figure 10:
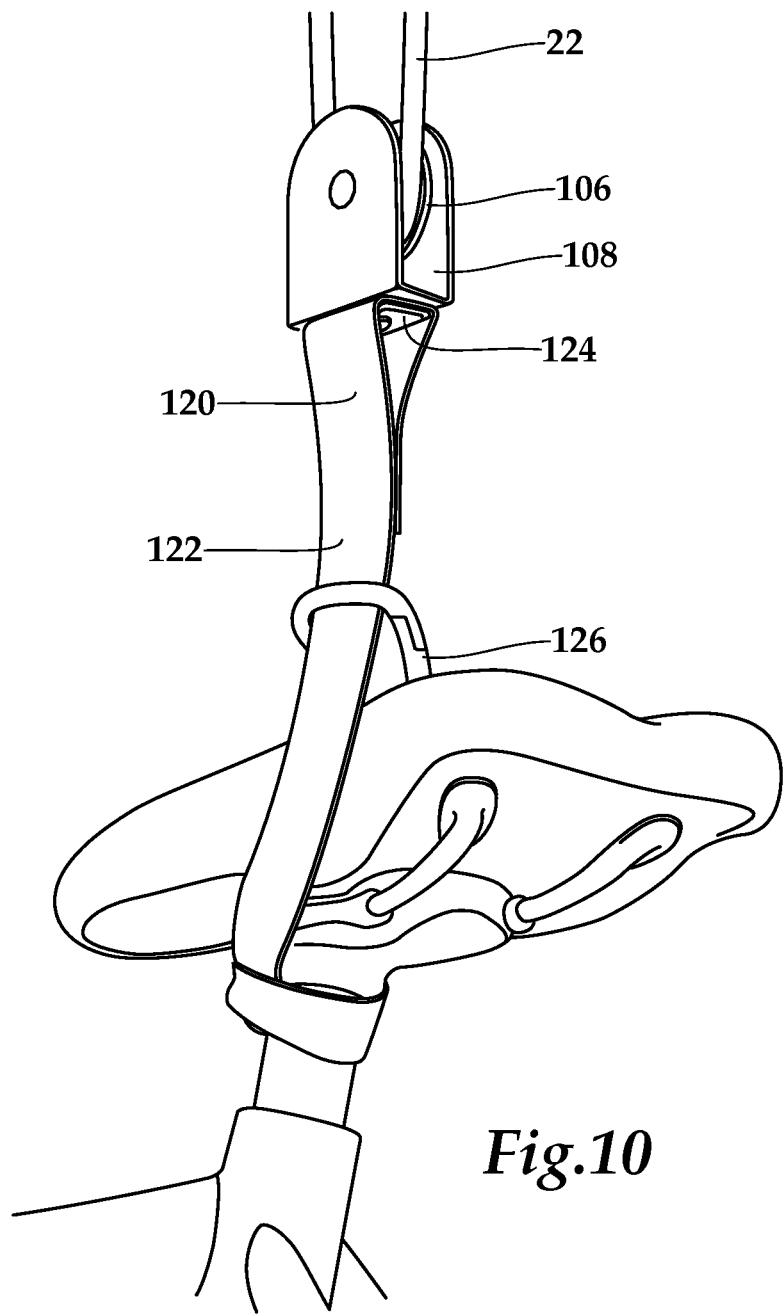
FIG. 10 is a perspective view of a carabineer and strap attachment used to support a bicycle from one of the pulleys of FIG. 1.

Supports 120 may have various configurations in order to support multiple elements of the bicycle 2. For example, as seen in FIG. 10, supports 120 may comprise webbing 122 such as a nylon strap coupled to a frame member 124. Coupling may be achieved via fastening, e.g., through use of a fastener, a washer or plate, and a locking nut, although other methods of coupling are possible. In addition, webbing 122 may be doubled-back over at least a portion of itself and affixed to itself in order to provide increased strength. An operative end of the webbing 122 may include a carabineer, clip, hook or other coupling mechanism 126 that may be used to engage elements of the bicycle 2.

To use, first mounting plate 12 may be fastened to a support 4 such as a ceiling joist. First mounting plate 12 may support the front end of the bicycle 2 and should be oriented such that the pulley 100 coupled to the plate faces the rearward portion of the bicycle. A plurality of fasteners 20 may be inserted through arched slots 31 so that heads of fasteners 20 may engage mounting plate 12 while shanks embed in support 4. When fasteners 20 are partially driven, arched slots 31 allow a user to rotate or otherwise align mounting plate 12 to orient pulley 100 coupled to plate 12 in an intended direction.

Second plate 14 may be mounted in a similar fashion to the same or a different support. However, second plate 14 should be mounted approximately 180 degrees reversed from first mounting plate 12 so that self-locking mechanism 110 faces generally rearward. By providing arched slots 31, 41 in mounting plates 12, 14, the plates may allow a user to mount to supports extending in different directions or to a single support that may be warped or distorted while still aligning pulley components in a substantially common plane, allowing for more efficient operation of the pulley system 10. Once plates 12, 14 are substantially aligned, fasteners 20 may be driven further into substrate 4, compressing plates 12, 14 between supports and heads of fasteners 20, inhibiting further rotation of plates 12, 14.

Spacing of first and second mounting plates may vary depending on the size of the object to be stored. For example, in the case of a bicycle 2, preferably, mounting plates 12, 14 may be spaced a distance approximately equal to the distance between the handle bars and the seat of the bicycle.

Once plates 12, 14 are substantially mounted to supports, rope 22 may be fed through first plate 12 and knotted or otherwise secured thereto. Rope 22 then may be fed under a wheel 106 spaced downward from the first plate 12, up and over wheel 106 coupled to first mounting plate, across to first wheel 106 coupled to second mounting plate 14, under wheel 106 spaced downward from the second mounting plate 14, up and over second wheel 106 coupled to second mounting plate 14 and through both components of self-locking mechanism 110. Bicycle does not have to be elevated completely, but may be elevated to a position high enough to provide sufficient ground clearance. System 10 may include, e.g., about 48' of rope or cable 22 and may allow a user to elevate bicycle completely for, e.g., a 12' or 14' ceiling, although system 10 may be used with different height ceilings, the length of the rope or cable 22 adjusted accordingly.

To use, strap 120 coupled to wheel 106 under first mounting plate 12 may be wrapped around a portion of the bicycle, e.g., about the handle bars, and then coupled to itself through the use of carabineer or other mechanism 126. Similarly, second strap 120 coupled to wheel 106 under second mounting plate 14 may be wrapped around a separate portion of the bicycle 2 such as the seat post and/or seat itself and then coupled to itself to secure the bicycle 2.

Once secured, bicycle 2 may be raised by pulling rope 22 downward, disengaging locking mechanism 110, rotating pulley wheels 106 and shortening distances between mounting plates 12, 14 and wheels 106 spaced downward from mounting plates 12, 14. When desired height is reached, a user may remove the downward force applied to the rope 22, causing both the first and second brackets to rotate upwards, compressing and frictionally engaging the rope 22 between the first and second brackets, preventing rope 22 from sliding and lowering bicycle 2. In addition, system 10 may include a cleat (not shown) fastened to a wall, and remaining rope 22 may be wrapped around cleat to further prevent lowering of bicycle 2 and/or to provide localized, compact storage of remaining rope 22.

While the foregoing written description of the invention enables one of ordinary skill to make and use what is considered presently to be the best mode thereof, those of ordinary skill will understand and appreciate the existence of variations, combinations, and equivalents of the specific exemplary embodiment and method herein. The invention should therefore not be limited by the above described embodiment and method, but by all embodiments and methods within the scope and spirit of the invention as claimed.

What is claimed is:

1. A storage system, comprising:
   a first mounting plate operatively coupled to a wheel;
   a second mounting plate spaced from said first mounting plate and operatively coupled to a plurality of wheels;
   at least one of said first and second mounting plates comprising a plurality arched channels, each channel configured to receive a fastener;
   a first wheel assembly spaced from said first mounting plate;
   a second wheel assembly spaced from said second mounting plate;
   a cable operatively engaging each of said wheels operatively coupled to said first mounting plate or said second mounting plate;
   a coupler extending from said first wheel assembly and a second coupler extending from said second wheel assembly; and
   a self-locking mechanism coupled to said second mounting plate, said self-locking mechanism comprising a first bracket rotationally coupled to said second mounting plate and a second bracket directly coupled to said first bracket;
   wherein said second bracket pivots at a point of said direct coupling;
   wherein each of said mounting plates comprises a base portion configured to be mounted substantially parallel to a mounting surface.

2. A storage system according to claim 1, wherein each of said mounting plates comprises a plurality of sides extending downward from said base.

3. A storage system according to claim 2, wherein said base and said plurality of sides are a unitary structure.

4. A storage system according to claim 3, wherein said base and said plurality of sides are stamped sheet metal.

5. A storage system according to claim 1, wherein said coupler and said second coupler each comprise a strap operatively coupled to a carabineer.

6. A storage system, comprising:
   a first plate and a second plate, each plate having a top with a base portion, a plurality of downwardly extending portions, and a plurality of fastener-receiving arched channels,
   at least one pulley rotatably coupled to said plurality of downwardly extending portions for each of said plates;
   a plurality of pulleys extending downward from said plates; and
   a cable operatively engaging said pulleys coupled to said plates and said pulleys extending downward from said plates;
   wherein said second plate has a second pulley rotatably coupled to said plurality of downwardly extending portions;
   said storage system further comprising a self-locking mechanism coupled to said second plate, said self-locking mechanism comprising a first bracket coupled to said downwardly extending portions and a second bracket mounted to said first bracket at an open end of said second bracket;

wherein said second bracket pivots at a point or said mounting.

7. A storage system according to claim 6, wherein said downwardly extending portions are generally parallel.

8. A storage system according to claim 6, wherein each of said downwardly extending pulleys is coupled to a pulley frame, and each pulley frame engages a coupling mechanism.

9. A storage system, comprising:

two plates, each plate having a top with a base portion and a plurality of extensions extending away from said base portion and generally coplanar with said base portion;

said base portions comprising a plurality of fastener-receiving arched channels;

said plates further comprising a plurality of downwardly extending portions, wherein each downwardly extending portion has top edges adjacent to at least two of said extensions;

at least one pulley rotatably coupled to said plurality of downwardly extending portions for each of said plates;

a plurality of pulleys extending downward from said plates; and a cable operatively engaging said pulleys coupled to said plates and said pulleys extending downward from said plates wherein a second plate has a second pulley rotatably coupled to said plurality of downwardly extending portions said storage system further comprising a self-locking mechanism coupled to said second plate, wherein said self-locking mechanism comprises a first bracket coupled to said downwardly extending portions and a second bracket coupled to said first bracket.

10. A storage system according to claim 9, wherein said edges of said downwardly extending portions are integral with edges of said extensions.

11. A storage system according to claim 9, wherein said downwardly extending portions are generally parallel.

12. A storage system according to claim 9, wherein each of said downwardly extending pulleys is coupled to a pulley frame, and each pulley frame engages a coupling mechanism.

* * * * *